(12) United States Patent
Zakowski

(10) Patent No.: US 9,386,883 B2
(45) Date of Patent: Jul. 12, 2016

(54) FOOD PROCESSOR FEED TUBE ASSEMBLY

(71) Applicant: Joseph W. Zakowski, New Canann, CT (US)

(72) Inventor: Joseph W. Zakowski, New Canann, CT (US)

(73) Assignee: CONAIR CORPORATION, Stamford, CT (US)

( * ) Notice: Subject to any disclaimer, the term of this patent is extended or adjusted under 35 U.S.C. 154(b) by 30 days.

(21) Appl. No.: 14/247,435

(22) Filed: Apr. 8, 2014

(65) Prior Publication Data

US 2014/0299699 A1   Oct. 9, 2014

Related U.S. Application Data

(60) Provisional application No. 61/809,493, filed on Apr. 8, 2013.

(51) Int. Cl.
| | |
|---|---|
| *A47J 43/00* | (2006.01) |
| *A47J 43/07* | (2006.01) |
| *A47J 43/04* | (2006.01) |
| *A47J 44/00* | (2006.01) |

(52) U.S. Cl.
CPC ............. *A47J 43/0716* (2013.01); *A47J 43/04* (2013.01); *A47J 44/00* (2013.01); *A47J 43/00* (2013.01)

(58) Field of Classification Search
CPC   B02C 18/2225; B02C 4/286; B02C 18/2291; B02C 18/22; A47J 19/027; A47J 43/255; A47J 42/00; A47J 42/18; A47J 42/36; A47J 42/44; A47J 42/46; A47J 42/50; A47J 43/04; A47J 43/0705; A47J 43/072; A47J 43/0716; A47J 44/00
USPC ............. 241/92, 236, 222, 224, 281.1, 281.2, 241/37.5
See application file for complete search history.

(56) References Cited

U.S. PATENT DOCUMENTS

| | | | |
|---|---|---|---|
| 7,673,823 B2* | 3/2010 | Mauch ................ | A47J 43/0716 241/282.1 |
| 7,686,240 B2* | 3/2010 | Pryor, Jr. ............. | A47J 43/0716 241/282.1 |
| 8,210,101 B2* | 7/2012 | Wu Chang ....................... | 99/510 |
| 2014/0190359 A1* | 7/2014 | Corkin et al. ................... | 99/511 |

* cited by examiner

*Primary Examiner* — Faye Francis
(74) *Attorney, Agent, or Firm* — Grogan, Tuccillo & Vanderleeden, LLP

(57) ABSTRACT

A feed tube assembly for a food processor is provided. The feed tube assembly includes a first member having a channel therethrough configured to be slidably received in a feed tube of a food processor, and a second member slidably received in the channel of the first member. The first member also includes a flat spring that extends into the channel to secure food items within the channel.

9 Claims, 2 Drawing Sheets

FOOD PROCESSOR FEED TUBE ASSEMBLY

CROSS-REFERENCE TO RELATED APPLICATIONS

This application claims the benefit of U.S. Provisional Application Ser. No. 61/809,493, filed on Apr. 8, 2013, which is herein incorporated by reference in its entirety.

FIELD OF THE INVENTION

The present invention relates to food processors and, more particularly, to a food processor having a feed tube assembly that secures food during processing.

BACKGROUND OF THE INVENTION

Food processing devices providing a number of different types of food preparations, such as mixing, grinding, chopping, slicing, grating, shredding, or other processing operations, are well known. Existing food processing devices typically include a base housing an electric motor, a drive shaft driven by the motor, a bowl receivable on the base and a lid or cover having a feed tube releasably mounted to the bowl. A rotatably driven blade is mounted to the drive shaft to process one or more food items inside the bowl.

While existing food processing devices are generally suitable for what is regarded as ordinary performance, there is room for improvement in terms of ease of use and expanded functionality.

SUMMARY OF THE INVENTION

It is an object of the present invention to provide a food processor having a feed tube.

It is another object of the present invention to provide a food processor having a feed tube that secures food items within the feed tube.

These and other objects are achieved by the present invention.

According to an embodiment of the present invention, a feed tube assembly for a food processor is provided. The feed tube assembly includes a first member having a channel therethrough configured to be slidably received in a feed tube of a food processor, and a second member slidably received in the channel of the first member. The first member also includes a flat spring that extends into the channel to secure food items within the channel.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

Figure 1:
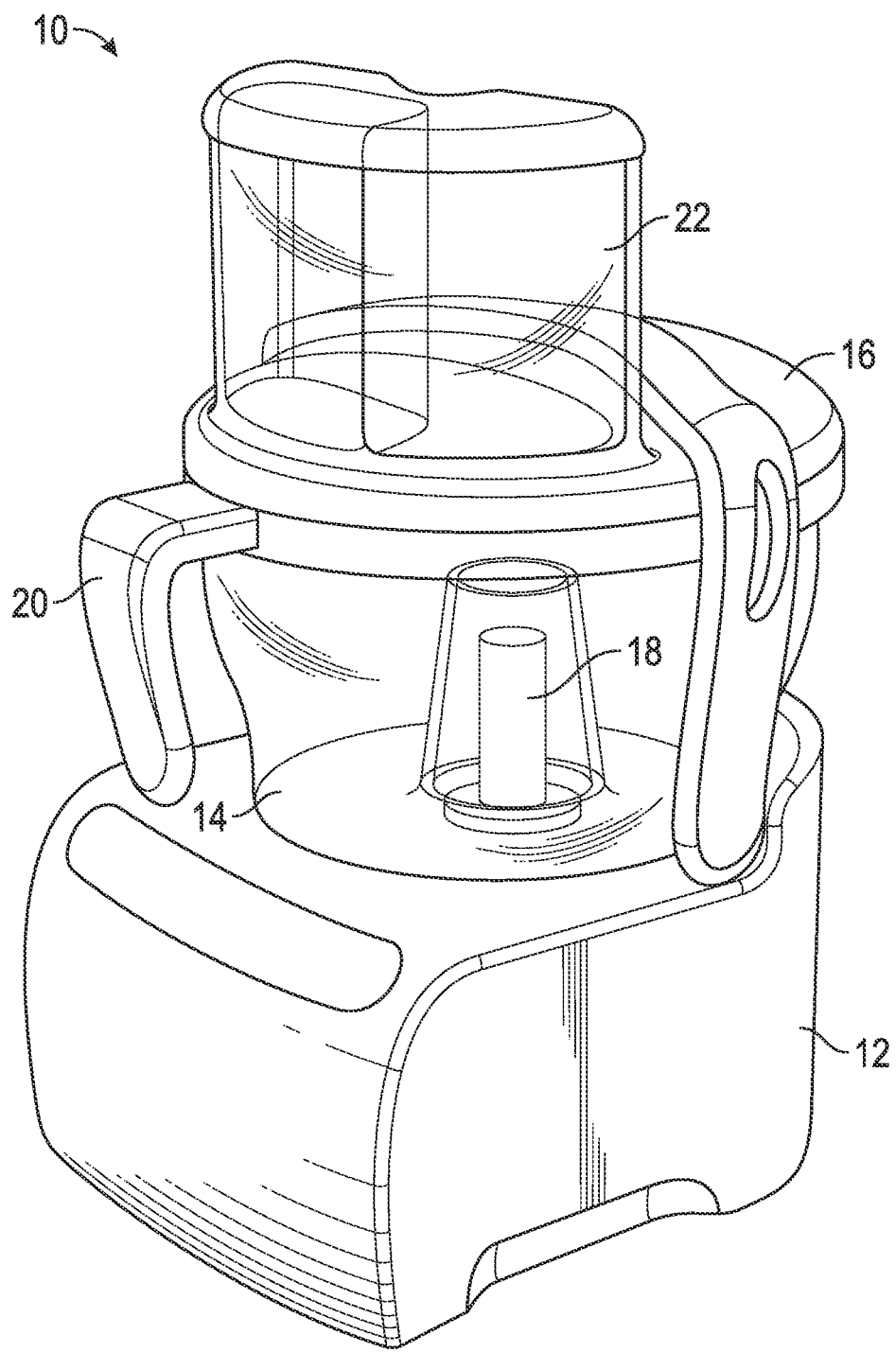
FIG. 1 is a perspective view of a food processor according to an embodiment of the present invention.

Referring to FIG. 1, a food processor 10 according to the present invention is shown. The food processor 10 includes a base 12, a work bowl or receptacle 14 received on the base 12, and a lid 16 configured to be selectively removable from the work bowl 14. Base 12 includes a motor or other rotary drive mechanism (not shown) connected to a rotatable output shaft 18 for rotatably driving a blade interior to the work bowl 14 and may include controls (not shown) for varying settings of the motor.

As further shown therein, work bowl 14 is generally cylindrical or frusto-conical in shape and has a handle 20 and a pour spout (not shown). The lid 16 defines a substantially circular body sized and is dimensioned to cover work bowl 14. The lid 16 also includes a feed tube opening (not shown). The feed tube opening may be generally oval in shape, although other shapes and dimensions are envisioned without departing from the broader aspects of the present invention.

As best shown in FIG. 1, the lid 16 may also include a feed tube 22 defining a substantially annular body having a substantially oval cross-section extending upwards from the lid 16 and in communication with the feed tube opening. As is well known in the art, the feed tube 22 provides a chute through which a user may load food items to be processed into the work bowl 14.

Figure 2:
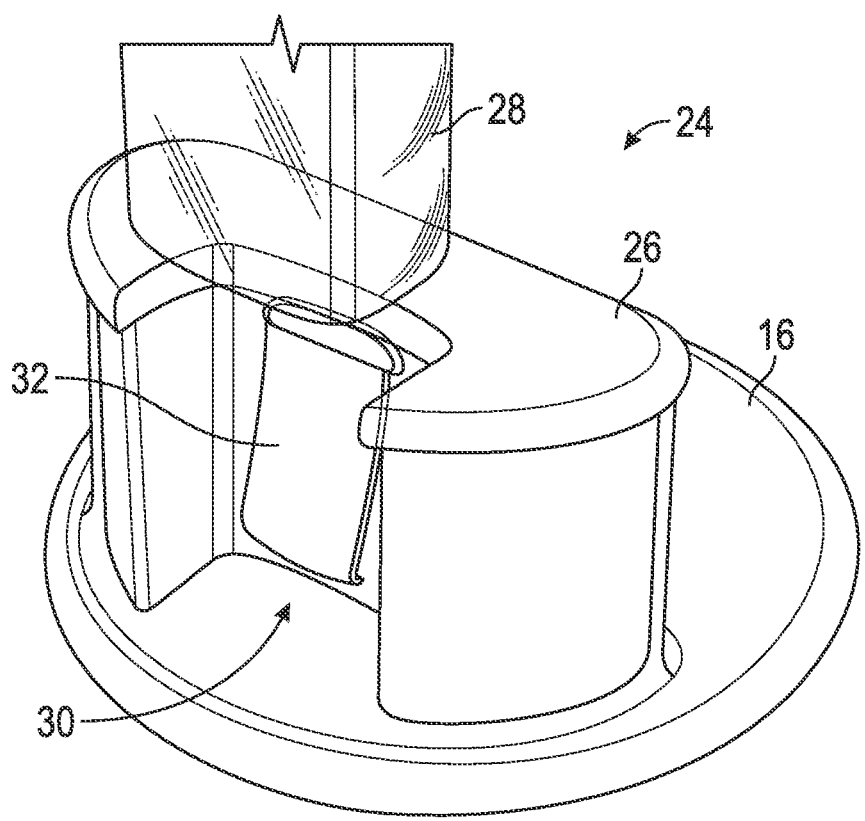
FIG. 2 is a perspective view of a feed tube assembly for a food processor according to an embodiment of the present invention.

Turning now to FIG. 2, a feed tube assembly 24 is slidably received in the feed tube 22. As shown therein, the feed tube assembly 24 includes a first member 26, and a second member 28 slidably received by the first member 26. In particular, the first member 26 defines a generally annular body having sidewalls and a closed top and bottom. The first member 26 is sized and shaped so as to be closely and slidably received by the internal walls of feed tube 22. The first member 26 also includes a channel 30 for slidably receiving the second member 28. The first member 26 and second member 28 may be referred to as a large food pusher and a small food pusher. As is known in the art, the food pushers 26, 28 are utilized by a user to urge food items in the feed tube 22 into the work bowl 14 for processing by the blade assembly (not shown). Importantly, the large food pusher 26 may be utilized for large food items and the small food pusher 28 may be utilized for smaller food items.

Figure 3:
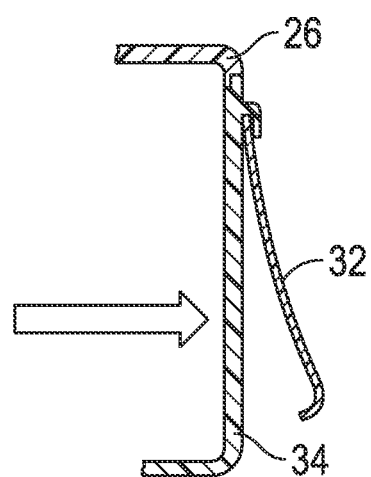
FIG. 3 is a enlarged, cross-sectional view of the feed tube assembly of FIG. 2.

With reference to FIGS. 2 and 3, the first member/food pusher 26 includes a spring, such as flat spring 32, that extends from the first member 26 into the channel 30. As best shown in FIG. 3, the top of the spring 30 is retained against the rear wall 34 of the channel 30 and the bottom of the spring is spaced from the rear wall 34. In particular, the spring 32 is biased to a position such that it is oriented at an angle with respect to the rear wall 34 of the channel 30 and such that the bottom of the spring 32 protrudes into the channel 30. In the preferred embodiment, the spring 32 is formed from stainless steel, although other materials may be utilized without departing from the broader aspects of the present invention.

Importantly, the spring 32 functions to help secure and retain food items within the channel 30 during processing. In particular, the spring 32 prevents food items from simply falling into the work bowl 14 too fast. In operation, a user loads food items into the channel 30, where the food items are retained by the spring 32, and utilizes the small food pusher 28 to urge the food items through the channel 30 and into the work bowl 14. Upon exerting downward pressure on the food items, the spring 32 is pushed against the rear wall 34 of the channel 30, against the bias of the spring, such that the food items in the channel 30 are permitted to now pass the spring 32.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A food processor, comprising:
   a base;
   a motor disposed within said base;
   an output shaft operatively connected to said motor and extending outwardly from said base, said output shaft being rotatable upon actuation of said motor;
   a work bowl received on said base;
   a lid removably received on said work bowl, said lid including a feed tube extending upwardly from said lid and defining a passageway configured to receive a food product therethrough for guiding said food product into said work bowl; and
   a first pusher member configured to be slidably received by said feed tube, said first pusher member having a body having a channel formed therein, a bottom surface for contacting said food product, and a retaining member extending from an internal wall of said channel into said channel, said retaining member being configured to retain said food product within said channel; and
   a second pusher member having a body and a bottom surface, said second pusher member being configured to be slidably received in said channel of said first pusher member.

2. The food processor of claim 1, wherein:
   said first pusher member is sized and shaped so as to be closely received by internal sidewalls of said feed tube.

3. The food processor of claim 1, wherein:
   said retaining member is selectively movable between a retaining position, in which said retaining member extends into said channel, and a pass-through position, in which said retaining member is urged against a wall of said channel by said second pusher member.

4. The food processor of claim 3, wherein:
   said retaining member is a flat spring.

5. The food processor of claim 1, wherein:
   said body of said second pusher member includes at least a first sidewall having a peripheral shape that corresponds to a shape of a sidewall defining said channel of said first pusher member, and at least a second sidewall having a peripheral shape that corresponds to a shape of an inner surface of said feed tube.

6. The food processor of claim 1, wherein:
   said first pusher member includes a top surface opposed to said bottom surface and substantially enclosing said body.

7. The food processor of claim 1, wherein:
   said feed tube and said body of said first pusher member are substantially annular in shape.

8. The food processor of claim 1, wherein:
   said work bowl is removably received on said base.

9. The food processor of claim 1, wherein:
   said channel is substantially U-shaped.

* * * * *